(12) United States Patent
Antonov et al.

(10) Patent No.: US 7,804,264 B2
(45) Date of Patent: Sep. 28, 2010

(54) COMMUTATION METHOD AND APPARATUS FOR A DC TO AC INVERTER DRIVING A THREE-PHASE ASYNCHRONOUS AC MOTOR

(75) Inventors: Sergey Antonov, Toronto (CA); Alexei I Antonov, Toronto (CA)

(73) Assignee: Science Bureau Inc.

( * ) Notice: Subject to any disclaimer, the term of this patent is extended or adjusted under 35 U.S.C. 154(b) by 357 days.

(21) Appl. No.: 12/025,027

(22) Filed: Feb. 2, 2008

(65) Prior Publication Data

US 2008/0117658 A1     May 22, 2008

(51) Int. Cl.
*H02K 23/00* (2006.01)
(52) U.S. Cl. .................................. 318/437; 363/95
(58) Field of Classification Search .............. 363/34, 363/37, 39, 41, 1; 318/8, 439, 499, 254, 318/437, 729
See application file for complete search history.

(56) References Cited

U.S. PATENT DOCUMENTS 5,168,439 A * 12/1992 Kumar et al. ................ 363/95
7,015,664 B2 * 3/2006 Coles et al. ............ 318/400.01

\* cited by examiner

*Primary Examiner*—Rajnikant B Patel

(57) ABSTRACT

Present invention belongs to the field of inverters, motor controllers and pulse modulated waveform generation methods and circuits. More specifically it belongs to such methods and circuits utilizing fundamental vectors. This invention features better and more efficient fundamental vectors. The proposed method offers reduced losses, increased efficiency and longer life time of inverters and motor controllers. Better approximation of a three-phase voltage waveform approaching the ideal one is a significant advantage of the proposed method. Another advantage is an easy decomposition of any point of an ideal sinusoidal voltage waveform into the fundamental vectors. This invention is particularly useful for a vector control of asynchronous AC motors.

13 Claims, 3 Drawing Sheets

DRAWINGS

ACTIVE VECTORS

ZERO VECTORS

| Angle | State | uS | State | uS | State | uS |
|---|---|---|---|---|---|---|
| 240° | [0 1 Z] | 481 | | | [Z 1 Z] | 75 |
| 252° | [0 1 Z] | 423 | [0 Z 1] | 116 | [0 Z Z] | 17 |
| 264° | [0 1 Z] | 327 | [0 Z 1] | 226 | [0 Z Z] | 3 |
| 276° | [0 1 Z] | 226 | [0 Z 1] | 327 | [0 Z Z] | 3 |
| 288° | [0 1 Z] | 116 | [0 Z 1] | 423 | [0 Z Z] | 17 |
| 300° | [0 Z 1] | 481 | | | [0 Z Z] | 75 |
| 312° | [0 Z 1] | 423 | [Z 0 1] | 116 | [Z Z 1] | 17 |
| 324° | [0 Z 1] | 327 | [Z 0 1] | 226 | [Z Z 1] | 3 |
| 336° | [0 Z 1] | 226 | [Z 0 1] | 327 | [Z Z 1] | 3 |
| 348° | [0 Z 1] | 116 | [Z 0 1] | 423 | [Z Z 1] | 17 |
| 0° | | | [Z 0 1] | 481 | [Z Z 1] | 3 |
| 12° | [Z 0 1] | 423 | [1 0 Z] | 116 | [Z 0 Z] | 3 |
| 24° | [Z 0 1] | 327 | [1 0 Z] | 226 | [Z 0 Z] | 17 |
| 36° | [Z 0 1] | 226 | [1 0 Z] | 327 | [Z 0 Z] | 75 |
| 48° | [Z 0 1] | 116 | [1 0 Z] | 423 | [Z 0 Z] | 17 |
| 60° | [1 0 Z] | 481 | | | [Z 0 Z] | 3 |
| 72° | [1 0 Z] | 423 | [1 Z 0] | 116 | [1 Z Z] | 3 |
| 84° | [1 0 Z] | 327 | [1 Z 0] | 226 | [1 Z Z] | 17 |
| 96° | [1 0 Z] | 226 | [1 Z 0] | 327 | [1 Z Z] | 75 |
| 108° | [1 0 Z] | 116 | [1 Z 0] | 423 | [1 Z Z] | 17 |
| 120° | | | [1 Z 0] | 481 | [1 Z Z] | 3 |
| 132° | [1 Z 0] | 423 | [Z 1 0] | 116 | [Z Z 0] | 3 |
| 144° | [1 Z 0] | 327 | [Z 1 0] | 226 | [Z Z 0] | 17 |
| 156° | [1 Z 0] | 226 | [Z 1 0] | 327 | [Z Z 0] | 75 |
| 168° | [1 Z 0] | 116 | [Z 1 0] | 423 | [Z Z 0] | 17 |
| 180° | [Z 1 0] | 481 | | | [Z Z 0] | 3 |
| 192° | [Z 1 0] | 423 | [0 1 Z] | 116 | [Z 1 Z] | 3 |
| 204° | [Z 1 0] | 327 | [0 1 Z] | 226 | [Z 1 Z] | 17 |
| 216° | [Z 1 0] | 226 | [0 1 Z] | 327 | [Z 1 Z] | 75 |
| 228° | [Z 1 0] | 116 | [0 1 Z] | 423 | [Z 1 Z] | 17 |

COMMUTATION METHOD AND APPARATUS FOR A DC TO AC INVERTER DRIVING A THREE-PHASE ASYNCHRONOUS AC MOTOR

Present invention belongs to the field of inverters, motor controllers and pulse modulated waveform generation methods and circuits. More specifically it belongs to such methods and circuits utilizing fundamental vectors. This invention features better and more efficient fundamental vectors. The proposed method offers reduced losses, increased efficiency and longer life time of inverters and motor controllers. Better approximation of a three-phase voltage waveform approaching the ideal one is a significant advantage of the proposed method. Another advantage is an easy decomposition of any point of an ideal sinusoidal voltage waveform into the fundamental vectors. This invention is particularly useful for a vector control of asynchronous AC motors.

PRIOR ART

Advanced power inverter and motor controllers use a pulse width modulation and vector control method. Different modulating schemes are used to produce PWM waveforms. The common objective of all these methods is to produce a modulating signal as close to a sinusoidal waveform as possible. Different implementation techniques are used. Hardware implementation solution is described in U.S. Pat. No. 5,182,701. Microprocessor based implementation is described in U.S. Pat. No. 6,069,808. These two US patents represent a state of the art solution for the problem. Both implementations rely upon essentially the same set of vectors also known as commutation patterns. There are six non-zero vectors and there are two zero vectors disclosed in those patents. The vectors are executed by three pairs of bridge-connected switches. It is a complete set of vectors which could be obtained under condition that every contact of a load is actively driven.

There are many problems associated with the use of the above mentioned set of vectors. Most essential one is the choice of zero vectors. The zero vectors are connecting all load contacts to a positive or a negative terminal of a DC power source. The fact that the load contacts are connected together is troublesome. A typical AC load may produce voltage differentials between contacts and, in particular, an asynchronous AC motor is known to produce back E.M.F. voltage. Consequently, currents are flowing through the switches, energy reflected from the load is dissipated, and currents essential for an asynchronous AC motor operation are collapsing being shorted through the switches during zero vector commutation state.

Another problem relates to non-zero vectors when zero voltage is to be emulated on a certain contact. This is achieved by an equal time application of two non-zero vectors having an opposite polarity on the contact. This results in voltage and current changing direction within the emulation cycle. Power dissipates on a load if the load is resistive. For inductive or capacitive load this leads to power being dissipated on the switches. Another problem associated with non-zero vectors is a necessity to switch simultaneously both switches in bridge configuration. This problem is commonly solved by introducing a dead time into the switching sequence. That resolves the problem but allows some time out of the emulating sequence to be wasted.

All problems taken together cause three-phase AC motor controllers and inverters to be somewhat inefficient and less reliable, particularly when emulated frequency is small and approaching zero.

The essence of our invention is a phase commutation method making an AC motor work effectively at lower than nominal rotation speeds. According to a required rotation speed, phase and electrical angle are calculated so that the resulting voltage on motor contacts is approaching a value of an optimum voltage sinus at this moment. This is achieved by choosing a combination of active motor contacts driven at a certain moment with a possible waiting time in their work. Consequently, generated for a certain period of time two-phase and three-phase states can imitate an optimum for the motor sinus voltage.

BRIEF DESCRIPTION OF THE DRAWINGS

FIG. 4 shows a full-period emulation sequence for three-phase 60 Hz sinusoidal voltage waveforms. The emulation is in steps of 12°, at 1.8 kHz PWM, rounded to 1 uS.

DETAILED DESCRIPTION OF THE INVENTION

This invention presents a commutation method to emulate a three-phase AC power source. The method emulates voltages of a three-phase AC power source. Commutation sequence, performed for a short time, emulates momentarily condition of a three-phase power source. The commutation sequence can be repeated over and over indefinitely, therefore producing a zero frequency three-phase AC power source. Commutation sequences, emulating consequent evenly spaced moments of the three-phase AC power source, produce a constant frequency three-phase AC power source.

The present invention presents an improvement to methods for power inverters and motor controllers. It is a goal of this invention to produce sinusoidal voltage waveforms as close to ideal as possible. It is another goal of this invention to reduce power dissipation both on the switches and on the load, increasing efficiency. It is yet another goal of this invention to produce sinusoidal voltage waveforms suitable for control of asynchronous AC motors at all speeds, including very slow ones.

The main feature of this invention is a new and efficient set of vectors (switching patterns) used for emulation of a sinusoidal waveforms. This set of vectors provides non-connecting no-current zero vectors. This invention also provides non-overlapping 'orthogonal' non-zero vectors.

Figure 1:
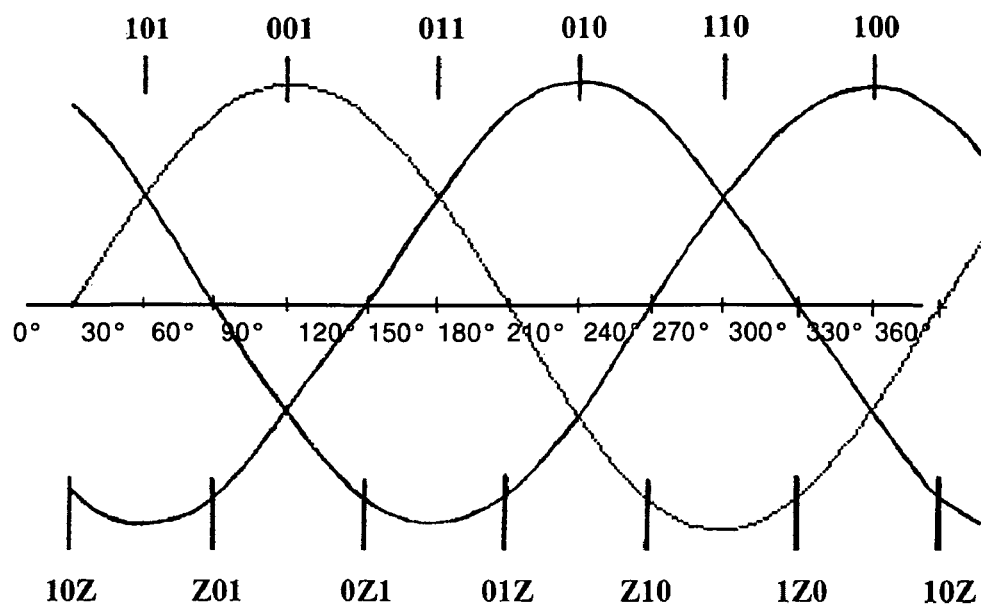
FIG. 1 shows an ideal three-phase voltage waveform. Points associated with prior art non-zero vectors are marked at the top of the drawing. Points associated with non-vectors of the present invention are marked at the bottom of the drawing.
Figure 2:
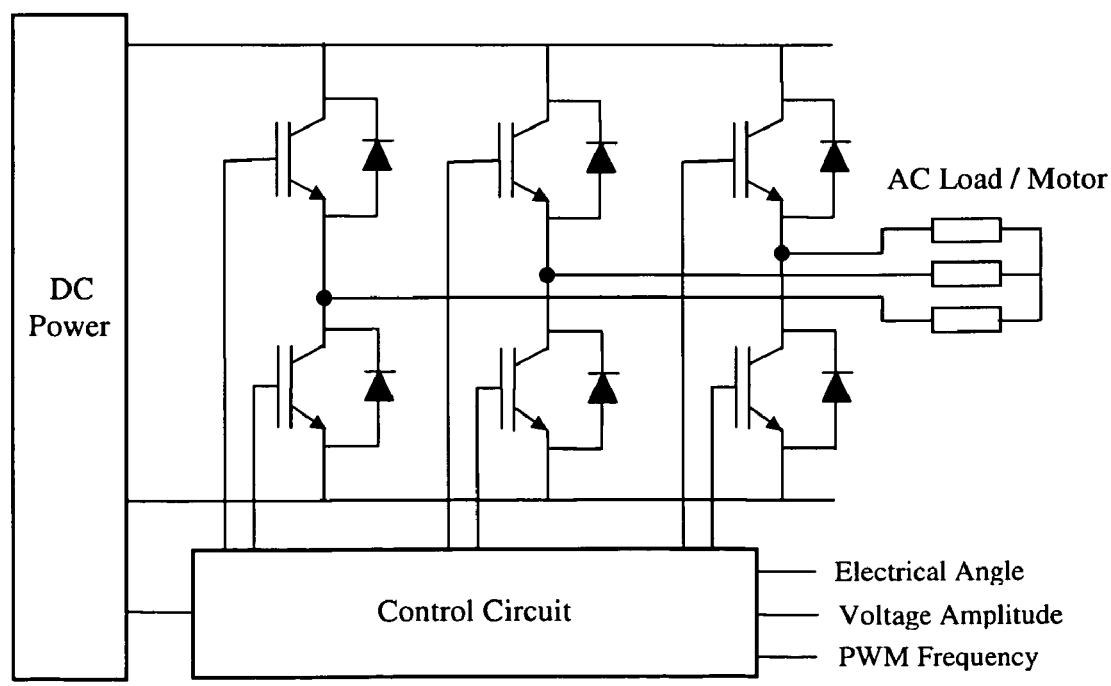
FIG. 2 shows a block diagram of the preferred embodiment of this invention including six bridge-connected switching elements, a three-phase AC Load, a DC Power source, a Control Circuit with Electrical Angle, Voltage Amplitude and PWM Frequency inputs.
Figure 3:
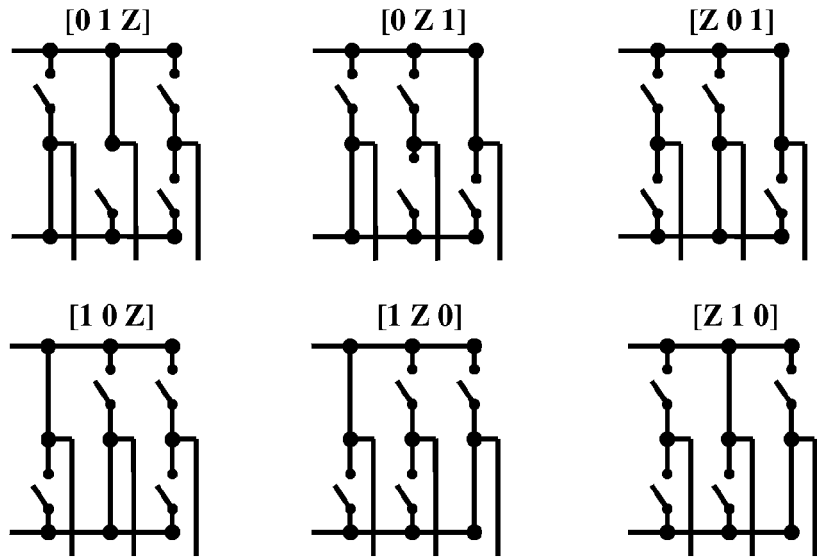
FIG. 3 shows communication patterns together with their vector notation representing the vectors of this invention.
Figure 3:
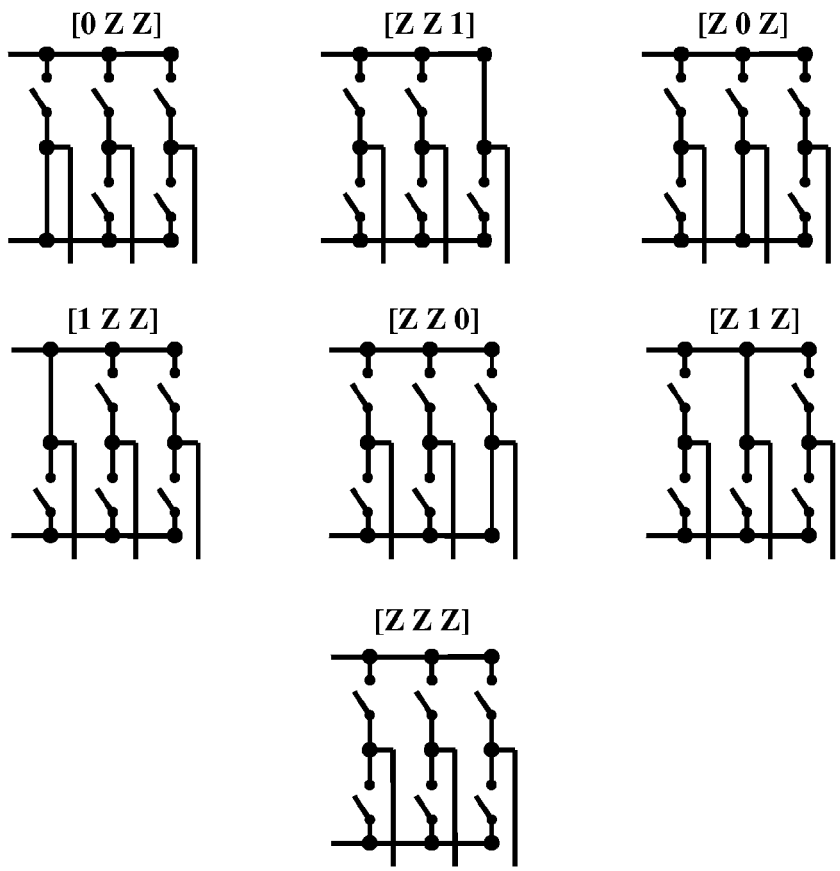

Both the prior art vectors and the vectors of this invention are shown on FIG. 1. Three characters depicting a vector represent various types of commutation. Each character is the state of a load contact: '1' represents connection to a positive terminal of a DC power source; '0' represents connection to a negative terminal of the DC power source; 'Z' represents no connection to the positive or negative terminal of the DC power source.

Switching patterns, proposed in this invention, include six non-zero vectors 10Z, Z01, 0Z1, 01Z, Z10, 1Z0 and seven zero vectors 0ZZ, Z1Z, ZZ0, ZZZ, 1ZZ, Z0Z, ZZ1. The prior art vectors and the vectors of this invention are superimposed in the drawing of an ideal three-phase AC voltage waveform. There is a phase shift of 30 degrees between the prior art non-zero vectors and the vectors of this invention.

The implementation of the method includes basic emulation sequence producing effective voltage proportional to voltage of an ideal sinusoidal waveform. The multiple of DC voltage and commutation time span is the effective voltage. The emulation sequence typically includes three time intervals with one interval occupied by a zero vector and two other ones occupied by non-zero vectors also known as fundamental vectors. There are six electrical angles where the emulation sequence includes two non-zero vectors only. The angles correspond to the prior art non-zero vectors. There are six other electrical angles where the emulation sequence contains one zero and one non-zero vectors only. The angles correspond to non-zero vectors of the present invention. We will describe further a general case of a three-vector emulation sequence. Above mentioned special cases are variants of the general case when one of the three vector time spans becomes zero.

Any point of an ideal three-phase voltage waveform is defined by an electrical angle. The normalized voltages on the load contacts at that point of an ideal three-phase voltage waveform are three sinus values calculated for the angle, the angle plus 120 degrees and the angle plus 240 degrees. The sinus values are showing both voltage values and polarity of voltages to be emulated on the load contacts. Positive sinus value indicates connection to a positive terminal of a DC power source. Negative sinus value indicates connection to a negative terminal of the DC power source. The connection remains for a time span. The time span is a fraction of a total time occupied by the emulation sequence. The absolute value of the sinus is indicative of the time share of the connection within the total time occupied by the emulation sequence. Maximum emulated voltage is voltage of the DC power source, multiplied by the total time of the emulation sequence. The sinus values are therefore equal to time shares of the connections within the emulation sequence.

Any commutation pattern which involves connections to both positive and negative terminals of the DC power source is a power connection also known as non-zero vector or fundamental vector. As it was mentioned, non-zero vectors of the prior art have one of the three load contacts connected to a terminal of the DC power source while two other load contacts are connected to the other DC power source terminal. Non-zero vectors of this invention have two contacts each connected to a DC power source terminal. The feature of an ideal three-phase voltage waveform is the equality of absolute voltages of opposite polarity or, in other words, if we have two positive momentarily voltage values, their sum is equal to an absolute value of the third negative voltage.

The emulation sequence is implemented as follows: two load contacts of the same polarity are connected to the same polarity terminal of the DC power source in separate time intervals occupied by two different non-zero vectors. Time spans of these vectors are proportional to their voltage values to be emulated. Time share of a non-zero vector associated to a particular contact is proportional to the sinus value associated with the contact at the electrical angle. The third load contact of the opposite polarity shall be connected to the opposite polarity terminal of the DC power source for the entire duration of the emulating sequence, forming all three vectors. The third vector has only one load contact connected to a DC power source terminal. The duration of the third vector is time remaining after non-zero vectors are elapsed, and calculated as total time duration of the emulation sequence less time span of said non-zero vectors. Because that third contact is permanently connected to the DC power source for the duration of the emulating sequence, this one load contact requires no switching for the entire 60 degrees segment of the emulated waveform. Above mentioned 60 degree segment lays between the two above mentioned non-zero vectors. We, therefore, recommend six different zero vectors, each one for every segment. The seventh zero vector, comprised of all load contacts being disconnected, could be used at any moment replacing any other zero vector. This method doesn't require dead time introduction and ensures least switching achievable.

At the positions corresponding to non-zero vectors of this invention (electrical angles of 0°, 60°, 120°, 180°, 240°, 300°, 360° the emulating sequence comprises a non-zero vector and a zero vector, with the zero vector occupying about 13% of the total time. This feature is not only allowing for emulating a sinusoidal waveform as close as possible, but also creating a voltage break essential for energizing an asynchronous AC motor at speeds close to zero.

It is common application for an inverter circuit to produce a three-phase voltage waveform with constant amplitude and frequency. This can be achieved by using this invention. The sequence of equally spaced electrical angles, each emulated by its own emulating sequence according to this invention, will produce the desired outcome. In other words: emulating a state of three-phase voltage waveform at particular angle, incrementing the angle by a constant value and repeating the process shall make the voltage waveform. It must be clear to those skilled in the art that such stream of consequent electrical angle points could be produced by a computer and/or an electric circuit realizing the function or utilizing a look-up table.

It is also possible to have calculating means as a part of the circuit implementing this invention. This means could produce a sequence of electrical angles according to a predetermined function.

As it must be also clear to those skilled in the art that electrical angle modifying procedure could be partially implemented within the circuit of this invention and partially aided by external source in form of commands, such as to increase the angle by value provided or execute a predetermined pattern already stored in memory or implemented within the circuit.

It is also maybe desired to change effective amplitude of a three-phase voltage waveform. Device of this invention should produce variable effective amplitude by scaling down the time spans of the non-zero vectors within the emulation sequences proportionally to some value. That value will be indicative of the provided amplitude. The multiplication of said time spans by said scaling value should be implemented within the device. This feature is particularly useful for uninterrupted power supplies and instrument applications.

It can also be useful to change the total time duration of the emulation sequence that will change effective PWM frequency applied to the load. The device of this invention could implement this function by scaling every time interval within the emulation sequence by some value. That value will be indicative of the PWM frequency. This feature could be particularly useful in AC motor control applications where limitations of the switches may require PWM frequency to meet optimum value. Another use of this feature could be found in a three-phase voltage waveform frequency control. Specifically, when hardware implementation is thought, it is easier to change frequency by a relatively small value using total emulation sequence period. Alternatively, when a processor-based implementation is used, it may be more convenient to implement small changes of the electrical angle or its derivatives.

It is typical for a vector control of an electric motor to produce some torque ripple also known as vibration. The implementation of this invention can cause mechanical vibration of an electric motor at effective PWM frequency. Therefore, it may be desired to choose the emulation sequence period, so that the effective PWM frequency does not coincide with mechanical resonance frequencies of the motor or its parts/attachments.

It is obvious that this invention could be used in a great variety of applications as it may be envisioned by those skilled in the art. The present invention can also be implemented in a great variety of ways by using programs executable on a computer, by electric circuits, integrated circuits, application specific integrated circuits, programmable integrated circuits, etc.

We claim:

1. A device comprising:
   a main circuit including six bridge-connected switching elements enabled to turn on and off in predetermined patterns so that a supplied from an external source DC voltage is converted into an approximately instant state of a three-phase AC voltage as defined by an electrical angle, and
   a control circuit connected to the main circuit for turning on and off the switching elements in order to provide switching patterns 10Z, Z01, 0Z1, 01Z, Z10, 1Z0 corresponding to six non-zero vectors, and 0ZZ, Z1Z, ZZ0, ZZZ, 1ZZ, Z0Z, ZZ1 corresponding to seven zero vectors;
   the control circuit provides an emulation sequence comprising at least two of the switching patterns, each provided for a time interval, where the switching patterns in the sequence and their time intervals are determined by the electrical angle.

2. A device as in claim 1, wherein said control circuit receives the electrical angle to define the emulation sequence from an external source.

3. A device as in claim 1, wherein said control circuit produces the electrical angle to define the emulation sequence.

4. A device as in claim 1, wherein said control circuit receives from an external source a command to change the electrical angle to define the emulation sequence and means to produce the electrical angle according to the command.

5. A device as in claim 1, wherein said control circuit vary varies an amplitude of the approximately instant state of a three-phase AC sinusoidal voltage by varying the time intervals in the emulation sequence.

6. A device as in claim 1, wherein said control circuit varies total time duration of the emulation sequence by varying the time intervals in the emulation sequence.

7. A method to control six bridge-connected switching elements, so that a supplied from an external source DC voltage is converted into an approximately instant state of a three-phase AC voltage as defined by an electrical angle, by turning on and off the switching elements in order to create an emulation sequence comprising at least two of the following eleven switching patterns: 10Z, Z01, 0Z1, 01Z, Z10, 1Z0 corresponding to six non-zero vectors, and 0ZZ, Z1Z, ZZ0, ZZZ, 1ZZ, Z0Z, ZZ1 corresponding to seven zero vectors, each provided for a time interval, where the switching patterns in the sequence and their time intervals are determined by the electrical angle.

8. A method as in claim 7, having a step of
   receiving from an external source the electrical angle to define the emulation sequence.

9. A method as in claim 7, having a step of
   calculating the electrical angle to define the emulation sequence.

10. A method as in claim 7, having steps of
    receiving from an external source a command to change the electrical angle to define the emulation sequence and calculating the electrical angle according to the command.

11. A method as in claim 7, having a step of
    varying the time intervals in the emulation sequence to vary an amplitude of the approximately instant state of three-phase AC sinusoidal voltage.

12. A method as in claim 7, having a step of
    varying the time intervals in the emulation sequence to vary total time duration of the emulation sequence.

13. A programming code stored in memory and executed on a processor, controlling six bridge-connected switching elements so that a supplied from an external source DC voltage is converted into an approximately instant state of a three-phase AC voltage as defined by an electrical angle, comprising:
    turning on and off the switching elements in order to provide switching patterns 10Z, Z01, 0Z1, 01Z, Z10, 1Z0 corresponding to six non-zero vectors, and 0ZZ, Z1Z, ZZ0, ZZZ, 1ZZ, Z0Z, ZZ1 corresponding to seven zero vectors, to create an emulation sequence comprising at least two of the switching patterns, each provided for a time interval, where the switching patterns in the sequence and their time intervals are determined by the electrical angle.

* * * * *